Nov. 22, 1960
T. H. GLAZE
2,961,039
TIRE BUFFING MACHINE
Filed April 9, 1957
3 Sheets-Sheet 2
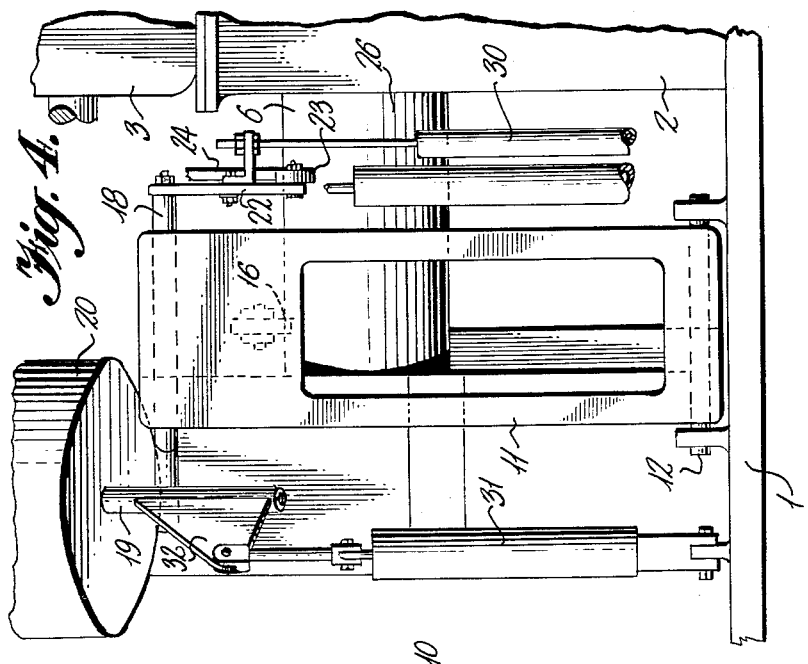
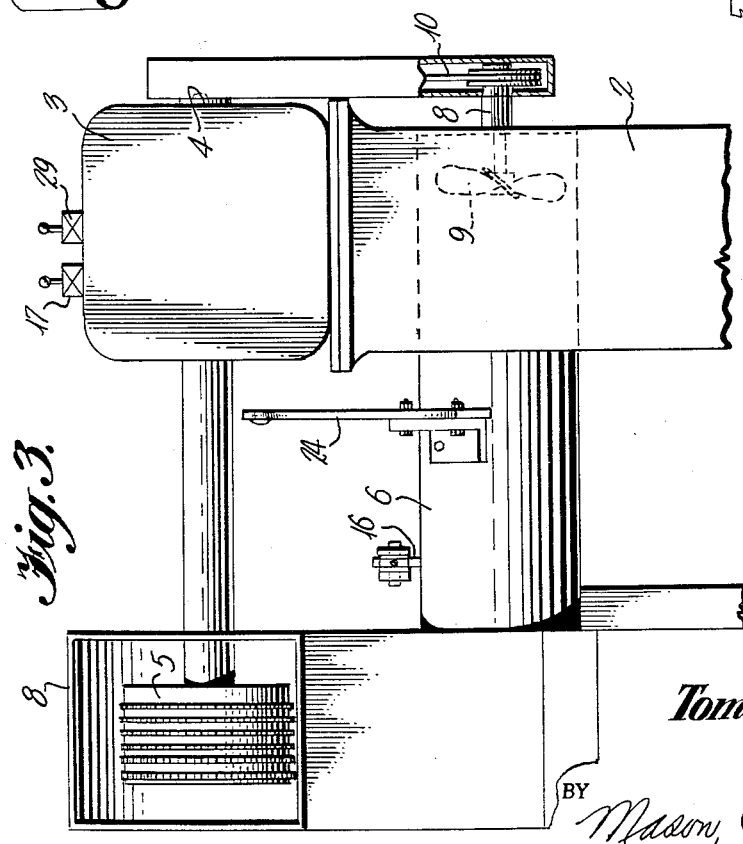
INVENTOR
*Tom H. Glaze*
BY
*Mason, Fenwick & Lawrence*
ATTORNEYS Nov. 22, 1960 — T. H. GLAZE — 2,961,039
TIRE BUFFING MACHINE
Filed April 9, 1957 — 3 Sheets-Sheet 3

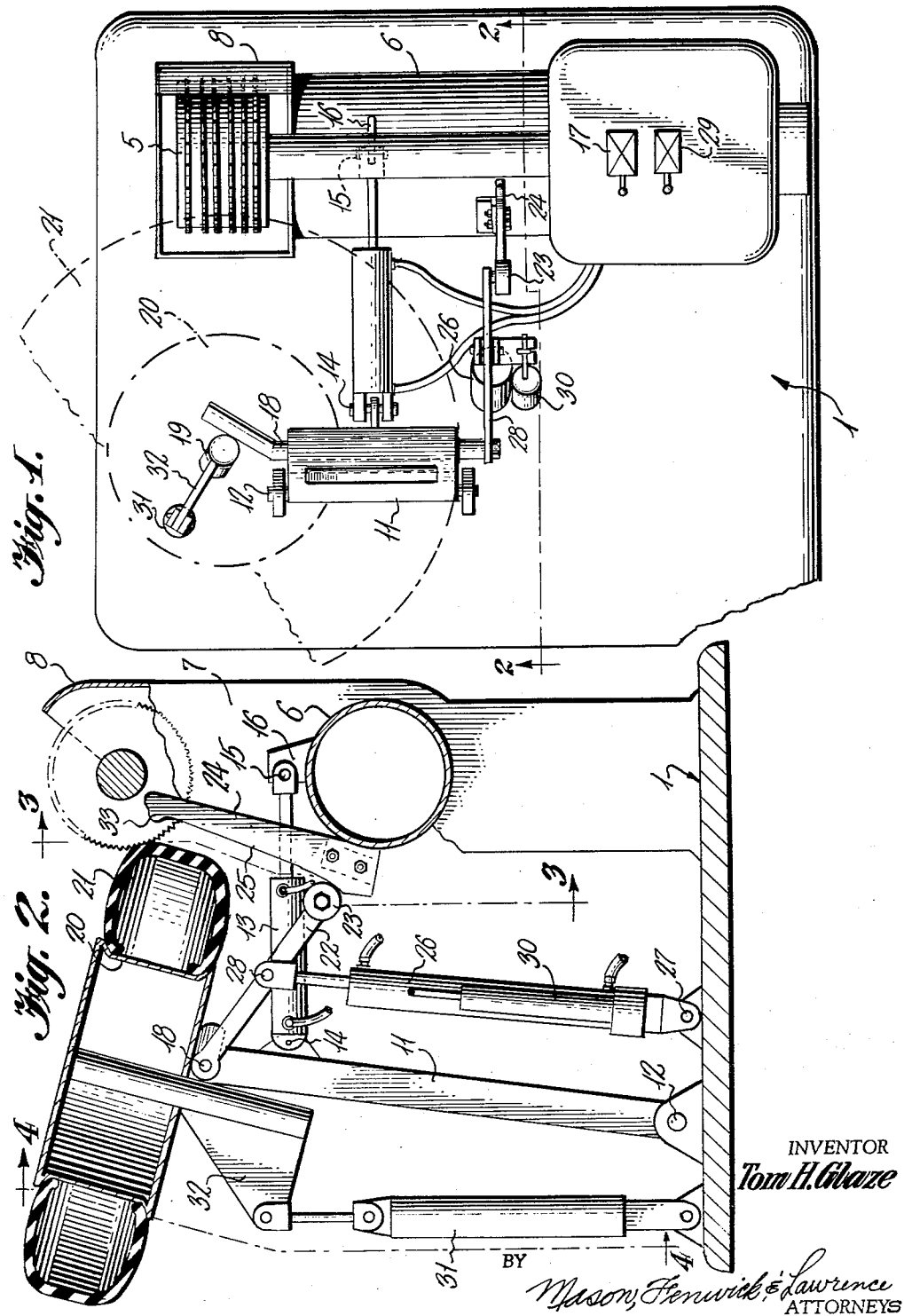

INVENTOR
Tom H. Glaze
BY Mason, Fenwick & Lawrence
ATTORNEYS

United States Patent Office 2,961,039
Patented Nov. 22, 1960

2,961,039

TIRE BUFFING MACHINE

Tom H. Glaze, Decatur, Ga., assignor to Gordy Tire Company, Atlanta, Ga., a corporation of Georgia Filed Apr. 9, 1957, Ser. No. 651,681

3 Claims. (Cl. 157—13)

This invention relates to machines for buffing tires to predetermined sizes and shape in preparation for a recapping operation.

There is no operation in the recapping industry more important than buffing tires to the proper size and shape. The tire must be symmetrical and of proper diameter to fit the recapping mold properly or the finished recapped tire will not be up to proper quality standards. This operation has been carried on in the past with the work being under control of an operator. Generally, a template was used to get some semblance of accuracy, but the template could function only to the degree of accuracy with which the operator used it. If the template is not in the proper plane or not in proper relationship to the tire the result will be as imperfect as if no template had been used.

The object of the present invention is to provide a machine which will be automatic in its operation and buff tires of the same rated size to exactly the same size and shape without the need for operator control.

A more specific object is to provide a machine of this character wherein the dgeree and contour of buffing will be controlled by a cam and the guide mechanism will be held in engagement with the cam and moved across the cam by hydraulic means.

Another object is to provide such a machine wherein the relative movement between the rasp and tire is controlled to prevent vibration and shocks which might cause unevenness in the operation.

Still another object of the invention is to provide means to collect and exhaust dust buffed from the tire.

Other objects of the invention will become apparent from the following description of one practical embodiment thereof when taken in conjunction with the drawings which accompany, and form part of, this specification.

In the drawings:

Figure 1 is a top plan view of a tire buffing machine embodying the principles of the present invention, the tire and mounting wheel being shown in dotted lines;

Figure 2 is a vertical section through the machine, taken substantially on the line 2—2 of Figure 1 with the tire and mounting wheel being shown in section;

Figure 3 is a vertical section transversely of the machine looking at the rasp side and taken on the line 3—3 of Figure 2;

Figure 4 is an end elevation viewed from the opposite end;

Figure 5:
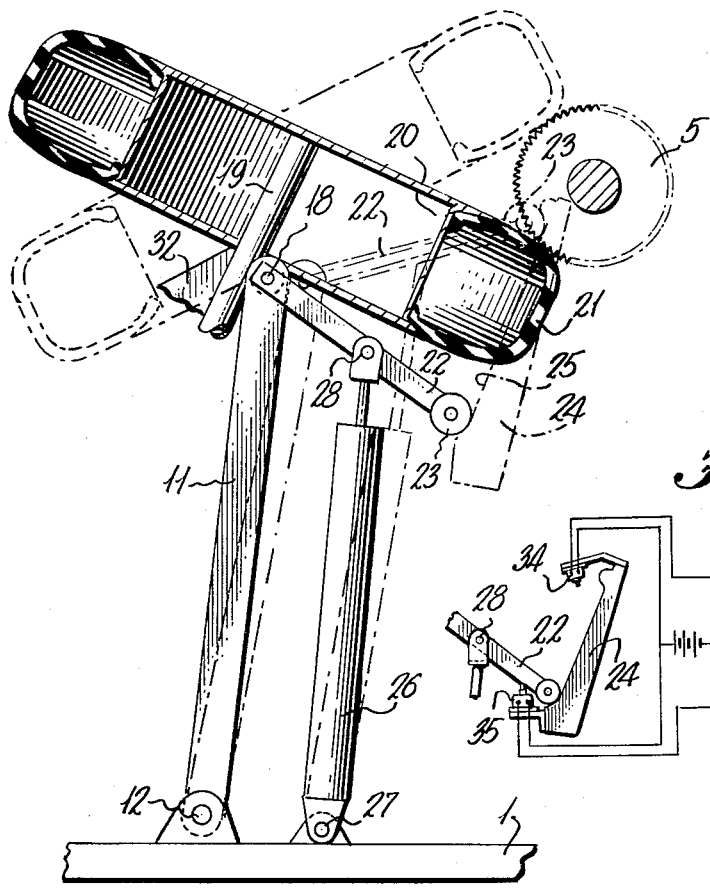
Figure 5 is a view of the tire-supporting and operating mechanism, showing the tire in its two extreme positions.

The invention consists generally of a rocking frame to support a tire mount, with means to draw the frame toward a rasp, the position of the frame relative to the rasp being controlled by a cam and cam follower with the cam follower held against the cam and moved thereover by fluid-operated means.

Referring to the drawings in detail, there is shown a tire buffing machine which is mounted upon a base 1. A pedestal 2 rises from the base and supports a motor 3 having a horizontal shaft 4 upon which is mounted a rasp 5. The rasp may be of any conventional type, and is shown as having a plurality of disks with peripheral saw-like teeth.

An exhaust duct 6 passes through, and is supported by the pedestal. A vertical intake riser 7 having a hood 8 to surround the rasp forms means to pick up rubber particles buffed off by the rasp and carry them away. The exhaust duct may be provided with an exhaust fan 9 to create a vacuum at the hood. A belt drive 10 from the motor serves to drive the fan.

A frame 11 is pivotally supported at its bottom as at 12, upon the base for rocking movement toward and from the rasp. The angular position of the frame is determined by a double acting, fluid-controlled cylinder and piston assembly 13, having the cylinder pivotally connected, as at 14 to the frame and the piston rod 15 connected to a bracket 16 carried by the exhaust duct. The cylinder is controlled by a four way valve mounted upon the motor housing to rock the frame toward or from the rasp.

A horizontal shaft 18 is rotatably mounted in the top of the frame and has the axle 19 welded to it. Axle 19 carries wheel 20 and is offset in the usual manner to cause tire 21 mounted on the wheel to rotate through contact with the rasp.

Shaft 18 is rocked to cause tilting of the tire by means of an arm 22 secured to its end. The arm has a cam-following roller 23 mounted at its free end to ride upon a cam 24 fixed to the exhaust duct. The contour of the cam edge 25 determines the tilting of the tire and the limit of movement of the frame 11 toward the rasp. Different cams will be supplied for different size tires.

The arm is caused to ride along the cam by means of another double acting fluid-operated cylinder and piston assembly 26 pivotally connected to the base, as at 27, and to the arm 22 intermediate its ends at 28. It will be obvious that rocking of the arm will cause the tire to tilt to present its entire peripheral surface to the rasp. Cylinder 26 is controlled by a four way valve 29 mounted on the motor.

It is important that the rocking motion of the tire be very smooth if the buffing is to be uniform. This means that the motion must be vibration free and devoid of jerks. To accomplish this, a check cylinder 30 is strapped to the cylinder 26 and has its piston rod attached to the piston rod of cylinder assembly 26. Cylinder 30 is designed to pass fluid very slowly on the upstroke, so that it acts to hold back the upward movement of the arm 22, thus smoothing out its operation. To supplement and balance the check 30, a shock absorber 31 of conventional design is attached to a bracket 32 mounted on axle 19, and to the base of the machine.

In operating the machine valve 17 is operated to cause cause cylinder assembly 13 to extend to full length, rocking frame 11 away from the rasp. Valve 29 is operated to fully contract cylinder assembly 26. A tire may then be mounted on wheel 20. When the tire is in place and inflated, valve 17 is actuated to contract cylinder assembly 13 to rock frame 11 toward the rasp. This motion will continue until cam follower 23 strikes cam 24. As cylinder assembly 26 is fully contracted the roller 23 will be at the bottom of the cam. A compressible fluid is used in the cylinders 13 and 26, and it will be seen that the cam follower will be yieldingly held against the cam. Thus the frame can move as required by cam action to hold the tire surface against the rasp. Valve 29 will then be operated to cause cylinder assembly 26 to extend to move the cam follower along the cam. This will provide the proper tilting of the tire. Cam 24 is provided with a protuberance 33 at its top to form a stop to limit the upward movement of the arm 22.

Figure 7:
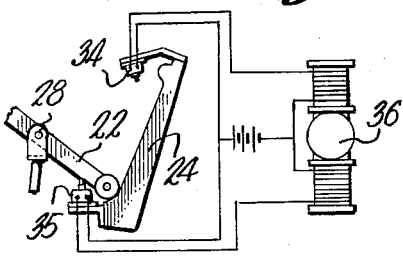
Figure 7 is a fragmentary view showing a slight modification.
Figure 6:
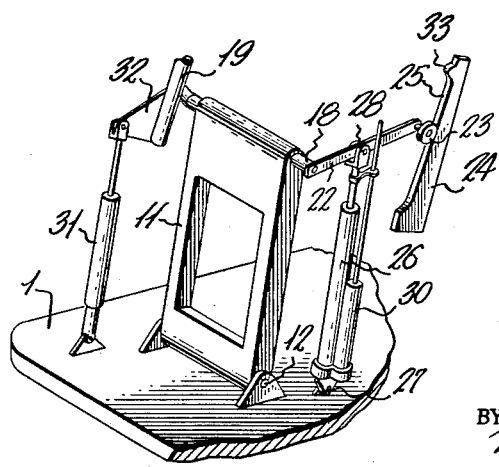
Figure 6 is a perspective view of the control mechanism of the machine.

In Figure 7 a slightly modified form of the invention is shown. Here, micro-switches 34 and 35 are provided at the top and bottom of the cam to give automatic reversing movement to the cam-follower arm 22. Actuation of the switches will cause operation of the solenoid controlled valve 36 to operate cylinder 26.

While in the above practical forms of the invention are shown, it will be understood that the details of construction shown and described are merely by way of illustration, and the invention may take other forms within the scope of the appended claims.

What is claimed is:

1. A tire buffing machine comprising, a base, a rotatable rasp supported by said base, a frame pivoted at one end to said base for rocking movement of the free end of said frame toward and from said rasp, a tire mount tiltably carried by said frame, a cam fixed with respect to said rasp, a cam follower carried by said frame and operable to tilt said tire mount, said cam having a stop to limit the movement of said frame toward said rasp, compressible fluid operated means to rock said frame toward the rasp and yieldingly hold the cam follower against the cam, and means to move said cam follower along said cam to tilt said tire mount.

2. In a tire buffing machine as claimed in claim 1, shock absorbing means coupled to said tire mount tilting means to ensure smooth operation thereof.

3. A tire buffing machine comprising, a base a rotatable rasp supported by the base, a frame pivoted at one end to the base for rocking movement of the frame toward and from the rasp, a tire mount tiltably carried by the frame, a cam fixed with respect to the rasp, a cam follower connected to the tire mount and tiltable with the mount, compressible fluid operated means to rock the frame to yieldably position and hold the cam follower against the cam to control the position of a tire on the tire mount relative to the rasp, and means to move the cam follower along the cam to tilt the tire mount so that there will be relative traversing movement between a tire on the tire mount and the rasp and the depth of rasp cut will be controlled at all points of traversing movement.

References Cited in the file of this patent
UNITED STATES PATENTS

| | | |
|---|---|---|
| 183,838 | Conner | Oct. 31, 1876 |
| 199,247 | Abbott | Jan. 15, 1878 |
| 2,045,778 | Huntley et al. | June 30, 1936 |
| 2,366,685 | Chambers | Jan. 2, 1945 |
| 2,636,277 | Hawkinson | Apr. 28, 1953 |
| 2,794,503 | Kraft | June 4, 1957 |